(No Model.) 2 Sheets—Sheet 1.
H. G. WILSHIRE & M. C. MASSIE.
SPEEDING DEVICE FOR RACE TRACKS.
No. 572,080. Patented Nov. 24, 1896.
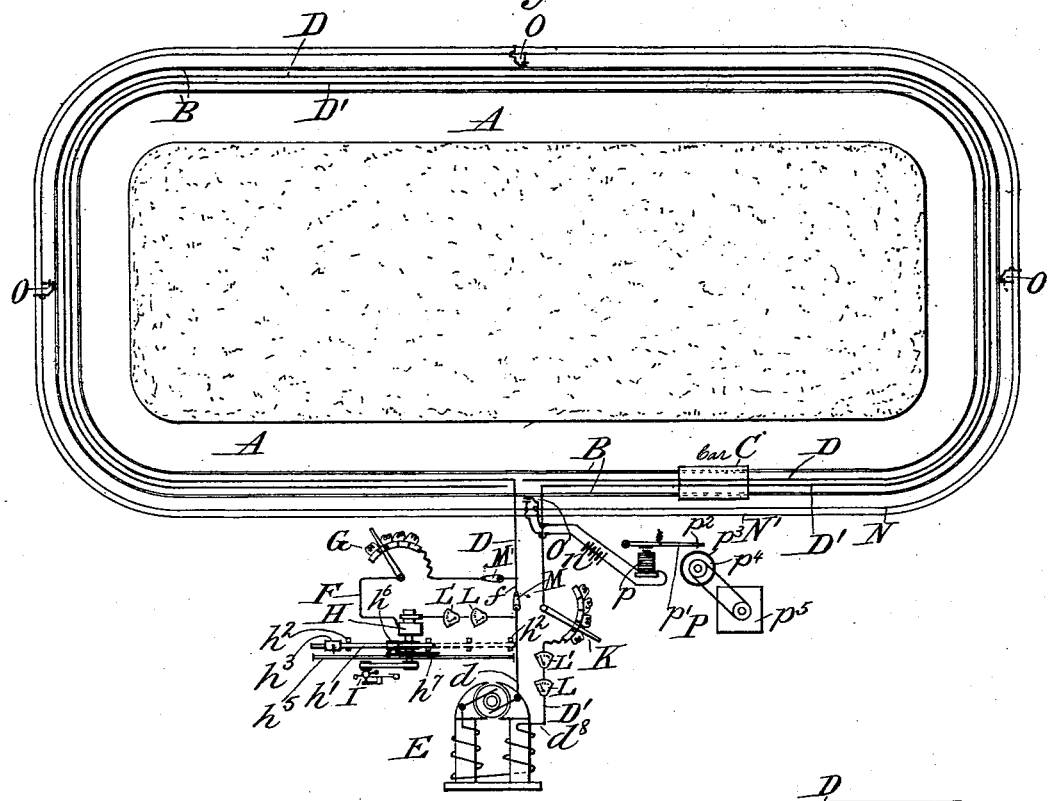
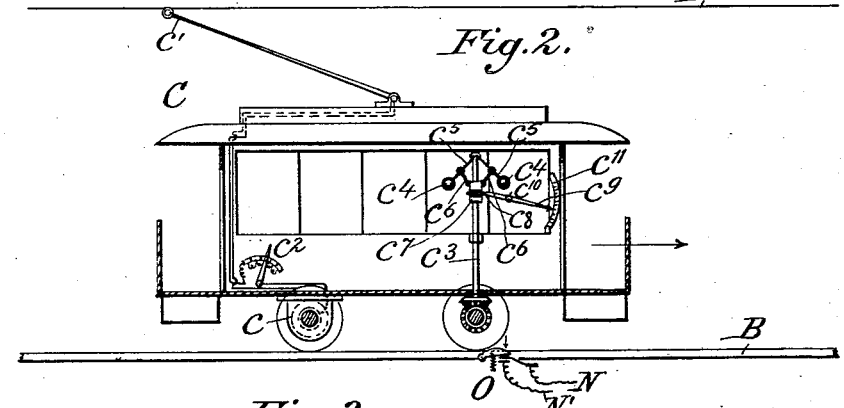
Attest:
H. H. Schott
Nettie Mitchell
Inventors:
H Henry G. Wilshire
and Mitford C. Massie
by Max Pinzü
Attorney (No Model.) 2 Sheets—Sheet 2.
H. G. WILSHIRE & M. C. MASSIE.
SPEEDING DEVICE FOR RACE TRACKS.
No. 572,080. Patented Nov. 24, 1896.
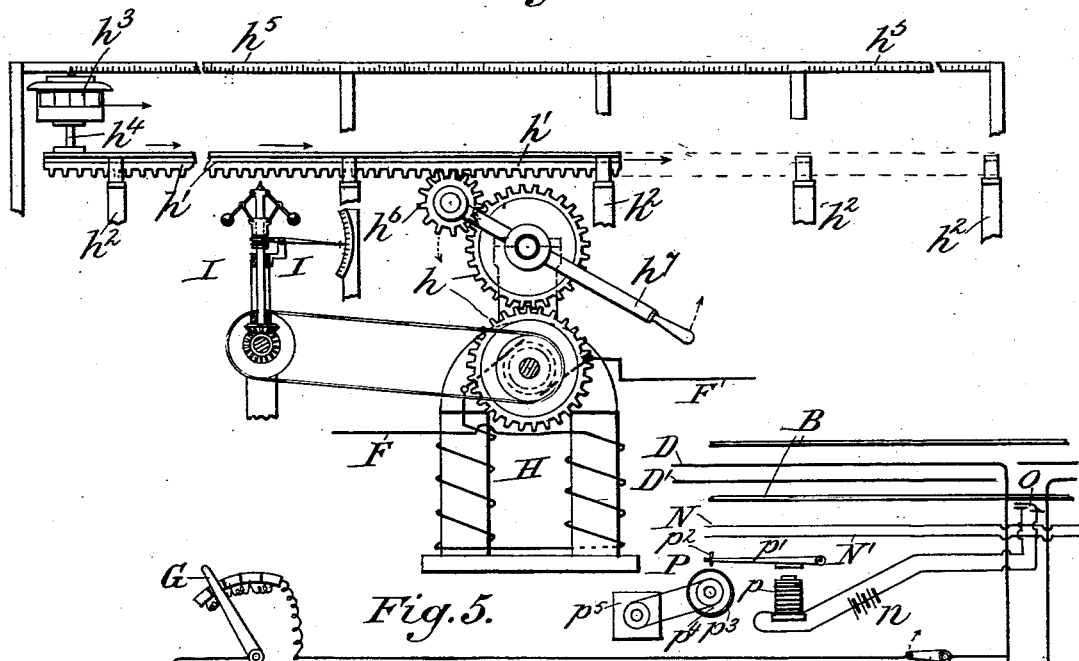
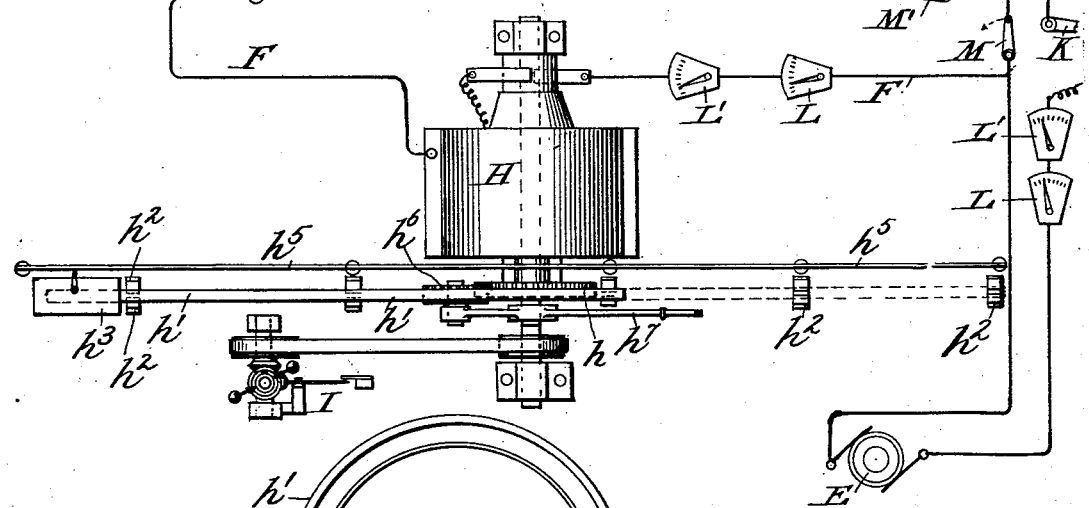
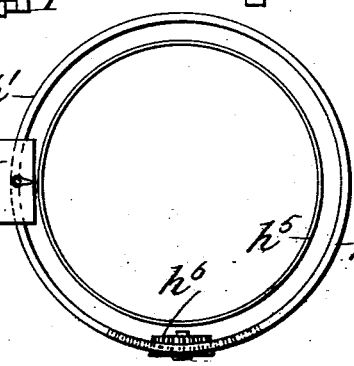
Attest:
F. H. Schott
Nettie Mitchell
Inventors:
Henry G. Wilshire and
Milford C. Massie
by Max Wing
Attorney
THE NORRIS PETERS CO., PHOTO-LITHO., WASHINGTON, D.C.

UNITED STATES PATENT OFFICE.

HENRY GAYLORD WILSHIRE, OF LOS ANGELES, CALIFORNIA, AND MITFORD C. MASSIE, OF WASHINGTON, DISTRICT OF COLUMBIA.

SPEEDING DEVICE FOR RACE-TRACKS.

SPECIFICATION forming part of Letters Patent No. 572,080, dated November 24, 1896.

Application filed May 12, 1896. Serial No. 591,271. (No model.)

*To all whom it may concern:*

Be it known that we, HENRY GAYLORD WILSHIRE, residing at Los Angeles, California, and MITFORD C. MASSIE, residing at Washington, District of Columbia, citizens of the United States, have invented certain new and useful Improvements in Speeding Devices for Race-Tracks; and we do hereby declare the following to be a full, clear, and exact description of the invention, such as will enable others skilled in the art to which it appertains to make and use the same.

Our invention relates to a new speeding, timing, and registering apparatus for bicycle and other race-tracks.

In running bicycle-races, especially those in which it is desired to attain a predetermined speed or "record," as it is called, it is often customary to employ a tandem bicycle to set the pace for the single rider, in order that he will have at all times during the race a criterion of the speed which he must attain.

The object of our invention is to avoid the use of such tandem bicycles as pace-setters, and thereby to avoid the disadvantage resulting therefrom.

Our invention consists in a car propelled by electricity and running on rails in proximity to the track over which the bicycles travel in connection with certain stationary regulating and indicating devices, the car thus taking the place of the tandem bicycle mentioned above, while the indicating and controlling devices introduce elements of certainty as to the record not readily obtained by previous devices with which we are acquainted.

In the drawings, Figure 1 is a diagrammatic plan view illustrating our invention. Fig. 2 is a detail view, on an enlarged scale, representing the car on the main track and its attached mechanism. Fig. 3 is a plan view of the same. Fig. 4 is a detail view of the indicator-motor and model-car. Fig. 5 is a detail plan view of the indicating and registering mechanism, and Fig. 6 is a detail view of a modification of our invention.

Referring to the drawings, A is a bicycle-track, shown in this instance as rectangular in shape with rounded corners, though of course it may be arranged in any other form. In proximity to, and in this case at the side of, the bicycle-track is arranged a railroad-track having two rails B, on which runs a pacer-car C, driven by an electric motor $c$, deriving its current through two rolling contacts or trolleys $c'$ from suitable conductors, such as the overhead trolley-wires D D', the car being arranged preferably with a rheostat $c^2$, by means of which the current to the car-motor $c$ may be controlled by a motorman on the car. The car is also provided with any suitable speed-indicator, and for this purpose we have devised the following:

A vertical indicator-shaft $c^3$, driven at its lower end through suitable gearing by the motor or the car-axle, is provided at its upper end with a centrifugal device constructed in a manner similar to a steam-engine governor and having two balls $c^4$, attached to the ends of arms $c^5$, which are pivotally attached to the upper end of the vertical shaft $c^3$, so as to swing in a vertical plane. To the said arms $c^5$ are pivoted links $c^6$, extending downward toward the shaft and pivotally connected to a sleeve $c^7$, loose upon the shaft $c^3$, and provided with a circumferential recess or groove in which enters a fork $c^8$, formed on the end of an index $c^9$, fulcrumed at $c^{10}$ and movable over a graduated scale $c^{11}$, which may be arranged to denote feet per second or quarters of a mile in seconds and fractions thereof. By this construction as the speed of the car increases the balls $c^4$ will diverge to a greater extent than when the speed of the car is less, and the index $c^9$ will be moved up or down and will point to the appropriate graduation on the scale, this indicating the speed of the car C in such a manner that it may be read at a glance.

The conductors or wires D D' are connected to the two poles of a dynamo E or other source of electricity, and for the purpose of keeping the resistance as nearly uniform as may be possible the starting end $d$ of one wire is connected to one pole of the dynamo, while the opposite or finishing end $d^8$ of the other wire is connected to the other pole of the dynamo. By this arrangement as the car travels along the two trolley-wires D D' it will lessen the resistance of one wire, while at the same time it increases the resistance of the other wire.

Thus if the wires are of practically equal resistance per foot the increase in the resistance of one will be compensated for by the decrease in the resistance of the other, and the total resistance of the car-motor circuit will be uniform, or nearly so. Hence the fluctuations in the current incidental to the movement of the car along the track will be greatly reduced.

A branch or shunt circuit F from the main line is provided, in the present instance being arranged between the dynamo and the trolley-wires or other conductors, this branch or shunt circuit including a set of resistance-coils G and an indicator-motor H. By means of the resistance-coils G the resistance of the branch or shunt circuit relative to that part $f$ of the main line in parallel with it may be adjusted, as desired, for the purpose of determining the proportion of the current passing over the branch or shunt circuit.

The indicator-motor H is employed to operate suitable indicating mechanism for indicating the speed of the pacer-car, the position of the same on the track, or both. The mechanism devised by us for this purpose is as follows:

The indicator-motor H drives a suitable gearing $h$, which in turn moves a rack-bar $h'$ at a slow rate of speed, the rack-bar being movable in ways or guides $h^2$, and carrying a movable position-indicator, such as the small model-car $h^3$, (shown in the drawings), by means of a rod $h^4$, fixed to the upper surface of the rack-bar. At one side of the car and rack-bar is placed a fixed scale $h^5$, divided into the same relative intervals as the car-track. From the description thus far given it will be understood that any variation in the resistance or current of the main line will also affect the shunt-circuit in like proportion, and hence when the car-motor is driven at an increased or decreased rate of speed the indicator-motor H will also be driven at a corresponding increase or decrease of speed, and the position-indicator $h^3$ will vary in its rate of travel in the same proportion as the large car. The gearing $h$ is so designed that the travel of the position-indicator will be a small proportion of the travel of the pacer-car, the scale of proportion between the two being such that the total travel of the position-indicator will be of such a length as to render the mechanism convenient for arrangement in the judges' stand. The position of the position-indicator $h^3$ relative to the scale $h^5$ will indicate the position of the pacer-car on the track, and the time of travel of the said position-indicator between any two graduations of the scale will indicate the time of the pacer-car in passing over the interval between any two points corresponding to the similar graduations on the scale. The pinion $h^6$ of the gearing $h$ in mesh with the rack-bar $h'$ is carried by a lever $h^7$, so that it may be swung out of gear with the rack-bar in order to allow the rack to be run back to its starting position.

As it may be desired to employ our device in connection with race-tracks of short length, the racers going several times around the track in order to make the desired distance, it may then be desirable to bend the rack-bar $h'$ into a circle, in order that the position-indicator may travel continuously several times around the circle, in which case the scale $h^5$ will also be bent into a circle. (See Fig. 6.) The small motor also drives through the gearing $h$ a speed-indicator I, in all respects similar to that on the car, which has been described already, and which will have its scale graduated so as to indicate at a glance the actual speed of the pacer-car.

In the main line, at one end of the connection with the shunt-circuit, is placed a rheostat K, so as to be readily operated from the judges' stand, in order that the speed of the pacer-car may be controlled at the judges' stand when desired, either as a warning to the motorman on the car that he is not running the car rapidly enough or too rapidly or to permit the operation of the car from a fixed point without the aid of any one on the car.

In the shunt-circuit and also in the main line are included suitable voltmeters L and ammeters L' to indicate the absolute and relative conditions of the main and shunt circuits. The usual switches or cut-outs M M' are also provided for opening or closing the circuits.

In addition to the mechanism thus far described a register-circuit is provided, consisting of two wires N N', laid around the track and connected at intervals to circuit-closers O, arranged to be operated by the car-wheels, so as to close the register-circuit as the car passes, these circuit-closers not being specially described herein, as they are old and well known and may be of any suitable or desired construction. The register-circuit is energized by a suitable source of electricity, as by the batteries $n$.

In the register-circuit at the judges' stand is included a register device P, comprising an electromagnet $p$, which, on the closing of the register-circuit, attracts its armature $p'$ and brings a pencil $p^2$ in contact with a sheet of paper $p^3$, wound around a drum $p^4$, revolved by suitable clockwork $p^5$, this form of register being well known in connection with indicating mechanism of various kinds, such as weather-vanes, aerometers, and the like.

This register mechanism serves as a check on the indicating mechanism, and also serves to allow the adjustment of the resistance in the main line by a preliminary trip of the pacer-car previous to the races to determine whether the indicator-motor operates in the proper proportion to the motor on the pacer-car.

From the description given of our invention it will be understood that the indicator-motor in the branch or shunt circuit is affected in speed in proportion to the alterations in speed of the pacer-car, and this proportional change of speed of the indicator-motor relative to the car-motor is made use of to alter the conditions of suitable indicating mechanism. This indicating mechanism may be either a speed-indicator, a position-indicator, or, for convenience, both.

Having thus fully described our invention, what we claim as new, and desire to secure by Letters Patent, is—

1. The combination, with a railroad, a car movable on the railroad, a motor arranged to propel the car, and a main circuit in which said motor is included, of a branch circuit, means for energizing both circuits, an indicator-motor in the branch circuit, and indicating mechanism operated by the motor in the branch circuit, substantially as described.

2. The combination, with a railroad, a car movable along the railroad, a motor arranged to propel the car, and a main circuit in which the said motor is included, of a shunt-circuit from the main circuit, a motor in the shunt-circuit, an indicating mechanism operated by the motor in the shunt-circuit, and means for energizing the circuits.

3. The combination, with a railroad, a car movable along the railroad, a motor on the car and arranged to propel the same, a pair of conductors, a source of electricity connected to one end of one conductor and to the opposite end of the other conductor, and means for carrying the current from the conductors to the car-motor, of a branch circuit from the main circuit, an indicator-motor located therein, and indicating mechanism operated by the indicator-motor.

4. In a speeding apparatus for race-tracks, the combination, with a railroad in proximity to the race-track, a car movable along the railroad, a motor on the car and arranged to propel the same, a main circuit in which the car-motor is included, and means for energizing said main circuit, of a shunt-circuit from the main circuit, an indicator-motor in the shunt-circuit, means for adjusting the resistance of the shunt-circuit, and indicating mechanism operated by the indicator-motor.

5. In a speeding apparatus for race-tracks, the combination, with a railroad in proximity to the race-track, a car movable along the railroad, a motor mounted on the car and arranged to propel the same, a pair of conductors, means for establishing electrical communication between the motor and the conductors, a rheostat and a speed-indicator on the car, a main circuit in which the conductors and car-motor are included, and means for energizing the main circuit, of a shunt-circuit from the main circuit, a rheostat at a fixed point in the main circuit, resistance-coils in the shunt-circuit, an indicator-motor included in the shunt-circuit, gearing driven by the indicator-motor, a position-indicator operated by the gearing, and a scale near which the position-indicator moves.

6. In a speeding apparatus for race-tracks, the combination, with a railroad in proximity to the race-track, a car movable along the railroad, a motor on the car and arranged to propel the same, and a main circuit in which said car-motor is included, of a shunt-circuit from the main circuit, a motor in the shunt-circuit, speed-indicating and position-indicating devices actuated by the motor in the shunt-circuit and means for energizing the circuits.

In testimony whereof we affix our signatures in presence of two witnesses.

HENRY GAYLORD WILSHIRE.
MITFORD C. MASSIE.

Witnesses as to Henry G. Wilshire:
U. H. GOWEN,
GEO. W. PARSONS.

Witnesses as to M. C. Massie:
NETTIE MITCHELL,
BERTHA L. DANA.